United States Patent
Didden (10) Patent No.: US 12,489,109 B2
(45) Date of Patent: Dec. 2, 2025

(54) SILICON COMPOSITION MATERIAL FOR USE AS BATTERY ANODE

(71) Applicant: LEYDENJAR TECHNOLOGIES B.V., Leiden (NL)

(72) Inventor: Arjen Peter Didden, Leiden (NL)

(73) Assignee: LEYDENJAR TECHNOLOGIES B.V., Leiden (NL)

( * ) Notice: Subject to any disclaimer, the term of this patent is extended or adjusted under 35 U.S.C. 154(b) by 678 days.

(21) Appl. No.: 17/634,054

(22) PCT Filed: Aug. 13, 2020

(86) PCT No.: PCT/NL2020/050510
§ 371 (c)(1),
(2) Date: Feb. 9, 2022

(87) PCT Pub. No.: WO2021/029769
PCT Pub. Date: Feb. 18, 2021

(65) Prior Publication Data
US 2022/0328814 A1   Oct. 13, 2022

(30) Foreign Application Priority Data
Aug. 14, 2019  (NL) .................................... 2023642

(51) Int. Cl.
*H01M 4/38*  (2006.01)
*H01M 4/04*  (2006.01)
(Continued)

(52) U.S. Cl.
CPC ......... *H01M 4/386* (2013.01); *H01M 4/0404* (2013.01); *H01M 4/0428* (2013.01);
(Continued)

(58) Field of Classification Search
CPC ...... H01M 4/386; H01M 4/04; H01M 4/0404; H01M 4/0428; H01M 4/661; H01M 4/62
See application file for complete search history.

(56) References Cited

U.S. PATENT DOCUMENTS 9,300,007 B1  3/2016  Dai et al.
9,929,407 B2  3/2018  Tanemura et al.
(Continued)

FOREIGN PATENT DOCUMENTS

CN  101106196 A  1/2008
CN  101355147 A  1/2009
(Continued)

OTHER PUBLICATIONS

International Preliminary Report on Patentability for International Application PCT/NL2020/050510, Report issued Jul. 9, 2021, Mailed Jul. 9, 2021, 14 pgs.
(Continued)

*Primary Examiner* — Kenneth J Douyette
(74) *Attorney, Agent, or Firm* — KPPB LLP (57) ABSTRACT

The invention is related to a silicon composite material for use as a rechargeable battery anode, comprising (i) an electrically conductive substrate comprising a foil of copper or titanium, (ii) an adhesion layer attached to the foil comprising at least one or more metals and/or metal compounds and (iii) an electrode layer comprising silicon attached to the adhesion layer.

14 Claims, 6 Drawing Sheets

(51) Int. Cl.
*H01M 4/66* (2006.01)
*H01M 4/02* (2006.01)
(52) U.S. Cl.
CPC .......... *H01M 4/661* (2013.01); *H01M 4/667* (2013.01); *H01M 2004/021* (2013.01); *H01M 2004/027* (2013.01)

(56) References Cited

U.S. PATENT DOCUMENTS

| | | |
|---|---|---|
| 9,979,009 B2 | 5/2018 | Tiwari |
| 10,333,148 B2 | 6/2019 | Karabacak et al. |
| 2002/0015833 A1 | 2/2002 | Takahashi et al. |
| 2007/0007239 A1 | 1/2007 | Lee et al. |
| 2007/0009801 A1 | 1/2007 | Inagaki et al. |
| 2007/0031733 A1 | 2/2007 | Kogetsu et al. |
| 2007/0031744 A1 | 2/2007 | Crouse et al. |
| 2007/0259452 A1 | 11/2007 | Schlenoff |
| 2008/0176144 A1 | 7/2008 | Iwama et al. |
| 2008/0237274 A1 | 10/2008 | Lester et al. |
| 2008/0299456 A1* | 12/2008 | Shiga ............ H01M 4/96 429/212 |
| 2009/0035651 A1 | 2/2009 | Hirose et al. |
| 2009/0238998 A1 | 9/2009 | Stowell et al. |
| 2010/0190055 A1 | 7/2010 | Khakhalev |
| 2010/0285358 A1 | 11/2010 | Cui et al. |
| 2011/0024169 A1 | 2/2011 | Buchine et al. |
| 2011/0111300 A1 | 5/2011 | Delhagen et al. |
| 2011/0111304 A1 | 5/2011 | Cui et al. |
| 2011/0229761 A1 | 9/2011 | Cui et al. |
| 2011/0254128 A1 | 10/2011 | Kuriki et al. |
| 2011/0289767 A1 | 12/2011 | Yamazaki |
| 2011/0291240 A1 | 12/2011 | Yamazaki |
| 2011/0300445 A1 | 12/2011 | Murakami et al. |
| 2012/0141866 A1 | 6/2012 | Kuriki et al. |
| 2013/0115510 A1 | 5/2013 | Tani et al. |
| 2014/0248543 A1 | 9/2014 | Zhu et al. |
| 2015/0004485 A1 | 1/2015 | Chen et al. |
| 2015/0104718 A1 | 4/2015 | Chen et al. |
| 2015/0180023 A1 | 6/2015 | Xiao et al. |
| 2015/0325852 A1 | 11/2015 | Wang et al. |
| 2016/0163470 A1 | 6/2016 | Murakami et al. |
| 2016/0181615 A1* | 6/2016 | Van Duren ......... H01M 10/052 429/232 |
| 2016/0197351 A1 | 7/2016 | Tani et al. |
| 2016/0285081 A1 | 9/2016 | Matsuno et al. |
| 2017/0098819 A9 | 4/2017 | Loveness et al. |
| 2017/0207493 A1 | 7/2017 | Mukherjee et al. |
| 2018/0062153 A1 | 3/2018 | Zhu et al. |
| 2018/0083264 A1 | 3/2018 | Soppe et al. |
| 2018/0102543 A1 | 4/2018 | Su et al. |
| 2018/0138514 A1 | 5/2018 | Schauer et al. |
| 2018/0254524 A1 | 9/2018 | Zhang et al. |
| 2018/0261847 A1 | 9/2018 | Su et al. |
| 2018/0337402 A1 | 11/2018 | Chen et al. |
| 2019/0088939 A1 | 3/2019 | Wang et al. |
| 2019/0267631 A1 | 8/2019 | Brewer et al. |
| 2019/0363339 A1 | 11/2019 | Zhu et al. |
| 2020/0087155 A1 | 3/2020 | Rupert |
| 2020/0161661 A1 | 5/2020 | Schauer et al. |
| 2020/0274156 A1 | 8/2020 | Wang et al. |
| 2020/0373584 A1 | 11/2020 | Morin et al. |
| 2020/0411851 A1 | 12/2020 | O'toole et al. |
| 2021/0050584 A1 | 2/2021 | Brewer et al. |
| 2021/0050591 A1 | 2/2021 | Brewer et al. |
| 2021/0050593 A1 | 2/2021 | Brewer et al. |
| 2021/0057733 A1 | 2/2021 | Brewer et al. |
| 2021/0057755 A1 | 2/2021 | Brewer et al. |
| 2021/0066702 A1 | 3/2021 | O'toole et al. |
| 2021/0104737 A1 | 4/2021 | Teng et al. |
| 2021/0119217 A1 | 4/2021 | Brewer et al. |
| 2021/0126250 A1 | 4/2021 | Jiang et al. |
| 2021/0135188 A1 | 5/2021 | Canton et al. |
| 2021/0135189 A1 | 5/2021 | Canton et al. |
| 2021/0135190 A1 | 5/2021 | Canton et al. |
| 2021/0143413 A1 | 5/2021 | Lee |
| 2021/0143428 A1 | 5/2021 | Browne et al. |
| 2021/0242456 A1 | 8/2021 | O'toole et al. |
| 2021/0273214 A1 | 9/2021 | Lin et al. |
| 2022/0115650 A1 | 4/2022 | Wang et al. |
| 2022/0181639 A1 | 6/2022 | Brewer et al. |
| 2022/0344627 A1 | 10/2022 | Warren et al. |
| 2022/0367975 A1 | 11/2022 | Ansari et al. |
| 2022/0376220 A1 | 11/2022 | Brewer et al. |
| 2023/0014638 A1 | 1/2023 | Brewer et al. |
| 2023/0015866 A1 | 1/2023 | O'toole et al. |
| 2023/0022169 A1 | 1/2023 | Brewer et al. |
| 2023/0050827 A1 | 2/2023 | O'toole et al. |
| 2023/0063959 A1 | 3/2023 | Brewer et al. |
| 2023/0081140 A1 | 3/2023 | Browne et al. |
| 2023/0142782 A1 | 5/2023 | Brewer et al. |
| 2023/0207831 A1 | 6/2023 | Brewer et al. |
| 2023/0207832 A1 | 6/2023 | Brewer et al. |
| 2023/0216061 A1 | 7/2023 | Brewer et al. |
| 2023/0268511 A1 | 8/2023 | Brewer et al. |
| 2023/0343968 A1 | 10/2023 | Brewer et al. |
| 2024/0234975 A1 | 7/2024 | Dubbelink et al. |
| 2024/0234976 A1 | 7/2024 | Dubbelink et al. |
| 2025/0023020 A1 | 1/2025 | Maas et al. |
| 2025/0079440 A1 | 3/2025 | Li et al. |

FOREIGN PATENT DOCUMENTS

| | | |
|---|---|---|
| CN | 102687313 A | 9/2012 |
| CN | 102709531 A | 10/2012 |
| CN | 102763246 A | 10/2012 |
| CN | 102884658 A | 1/2013 |
| CN | 105226258 A | 1/2016 |
| CN | 105229826 A | 1/2016 |
| CN | 106663786 A | 5/2017 |
| CN | 110036508 A | 7/2019 |
| CN | 110234808 A | 9/2019 |
| CN | 111403684 A | 7/2020 |
| CN | 113346044 A | 9/2021 |
| CN | 114467209 A | 5/2022 |
| CN | 114600266 A | 6/2022 |
| DE | 19812558 B4 | 9/2010 |
| DE | 102015119335 A1 | 5/2017 |
| EP | 2387063 A1 | 11/2011 |
| EP | 2549567 A1 | 1/2013 |
| EP | 2605313 A1 | 6/2013 |
| EP | 2764565 A1 | 8/2014 |
| EP | 3014679 A1 | 5/2016 |
| EP | 3143657 A1 | 3/2017 |
| EP | 3375027 A1 | 9/2018 |
| EP | 3541992 A1 | 9/2019 |
| EP | 3561918 A1 | 10/2019 |
| EP | 3738704 A1 | 11/2020 |
| EP | 3876311 A1 | 9/2021 |
| EP | 3896759 A1 | 10/2021 |
| EP | 4014272 A1 | 6/2022 |
| EP | 4055645 A1 | 9/2022 |
| EP | 4055652 A1 | 9/2022 |
| EP | 4014266 B1 | 9/2023 |
| GB | 2458942 A | 10/2009 |
| JP | 2006180216 A | 7/2006 |
| JP | 2008010320 A | 1/2008 |
| JP | 2008210564 A | 9/2008 |
| JP | 2009032492 A | 2/2009 |
| JP | 2010103005 A | 5/2010 |
| JP | 2010123260 A | 6/2010 |
| JP | 2010123388 A | 6/2010 |
| JP | 2010148612 A | 7/2010 |
| JP | 2010282959 A | 12/2010 |
| JP | 2011238602 A | 11/2011 |
| JP | 2012014895 A | 1/2012 |
| JP | 2013206555 A | 10/2013 |
| JP | 2014531733 A | 11/2014 |
| JP | 2015146319 A | 8/2015 |
| JP | 2015198020 A | 11/2015 |
| JP | 2016085989 A | 5/2016 |
| JP | 2016106360 A | 6/2016 |
| JP | 2016122658 A | 7/2016 |
| JP | 2017521812 A | 8/2017 |

(56) References Cited

FOREIGN PATENT DOCUMENTS

| | | |
|---|---|---|
| JP | 2020502723 A | 1/2020 |
| JP | 2020507195 A | 3/2020 |
| JP | 2021002532 A | 1/2021 |
| JP | 2021515376 A | 6/2021 |
| JP | 2021119564 A | 8/2021 |
| JP | 2021141040 A | 9/2021 |
| JP | 2022078165 A | 5/2022 |
| JP | 2022544754 A | 10/2022 |
| KR | 20080002651 A | 1/2008 |
| KR | 20090012143 A | 2/2009 |
| KR | 20110115964 A | 10/2011 |
| KR | 20110131095 A | 12/2011 |
| KR | 20120094249 A | 8/2012 |
| KR | 20130031301 A | 3/2013 |
| KR | 20140099864 A | 8/2014 |
| KR | 20170003641 A | 1/2017 |
| KR | 20170134683 A | 12/2017 |
| KR | 20190056430 A | 5/2019 |
| KR | 20200008177 A | 1/2020 |
| KR | 20200135576 A | 12/2020 |
| KR | 20210111682 A | 9/2021 |
| KR | 20210158424 A | 12/2021 |
| KR | 20220093362 A | 7/2022 |
| NL | 2014588 A | 10/2016 |
| NL | 2023642 B1 | 2/2021 |
| NL | 2029989 B1 | 6/2023 |
| NL | 2032368 B1 | 1/2024 |
| NL | 2032414 B1 | 1/2024 |
| TW | 201212361 A | 3/2012 |
| TW | 201611392 A | 3/2016 |
| TW | 202134049 A | 9/2021 |
| WO | 1994011544 A1 | 5/1994 |
| WO | 2006028316 A1 | 3/2006 |
| WO | 2010129910 A2 | 11/2010 |
| WO | 2011119614 A2 | 9/2011 |
| WO | 2011152190 A1 | 12/2011 |
| WO | 2011119614 A3 | 1/2012 |
| WO | 2012002304 A1 | 1/2012 |
| WO | 2012093224 A1 | 7/2012 |
| WO | 2013052456 A1 | 4/2013 |
| WO | 2013080459 A1 | 6/2013 |
| WO | 2015175509 A1 | 11/2015 |
| WO | 2015188959 A1 | 12/2015 |
| WO | 2016163878 A1 | 10/2016 |
| WO | 2018071846 A1 | 4/2018 |
| WO | 2019113534 A1 | 6/2019 |
| WO | 2019165412 A1 | 8/2019 |
| WO | 2021029769 A1 | 2/2021 |
| WO | 2021030461 A1 | 2/2021 |
| WO | 2021091757 A1 | 5/2021 |
| WO | 2021091762 A1 | 5/2021 |
| WO | 2021207357 A1 | 10/2021 |
| WO | 2022005999 A1 | 1/2022 |
| WO | 2022235158 A1 | 11/2022 |
| WO | 2022235159 A1 | 11/2022 |
| WO | 2022241096 A1 | 11/2022 |
| WO | 2023033890 A1 | 3/2023 |
| WO | 2023101551 A1 | 6/2023 |
| WO | 2023121462 A1 | 6/2023 |
| WO | 2023128764 A1 | 7/2023 |
| WO | 2024010448 A1 | 1/2024 |
| WO | 2024010454 A1 | 1/2024 |

OTHER PUBLICATIONS

International Preliminary Report on Patentability for International Application PCT/NL2022/050241, Report issued Oct. 24, 2023, Mailed Nov. 16, 2023, 11 pgs.
International Preliminary Report on Patentability for International Application PCT/NL2022/050242, Report issued Oct. 24, 2023, Mailed Nov. 16, 2023, 11 pgs.
International Preliminary Report on Patentability for International Application PCT/NL2022/050691, Report issued May 2, 2024, Mailed Jun. 13, 2024, 7 pgs.
International Preliminary Report on Patentability for International Application PCT/NL2022/050754, Report issued Jun. 20, 2024, Mailed Jul. 4, 2024, 11 pgs.
International Preliminary Report on Patentability for International Application PCT/NL2022/050766, Report issued Jun. 20, 2024, Mailed Jul. 11, 2024, 8 pgs.
International Search Report and Written Opinion for International Application No. PCT/NL2020/050510, Search completed Oct. 14, 2020, Mailed Oct. 22, 2020, 10 pgs.
International Search Report and Written Opinion for International Application No. PCT/NL2022/050241, Search completed Jul. 27, 2022, Mailed Aug. 4, 2022, 14 pgs.
International Search Report and Written Opinion for International Application No. PCT/NL2022/050242, Search completed Jul. 28, 2022, Mailed Aug. 5, 2022, 14 pgs.
International Search Report and Written Opinion for International Application No. PCT/NL2022/050691, Search completed Feb. 10, 2023, Mailed Feb. 20, 2023, 9 pgs.
International Search Report and Written Opinion for International Application No. PCT/NL2022/050754, Search completed May 14, 2023, Mailed May 23, 2023, 14 pgs.
International Search Report and Written Opinion for International Application No. PCT/NL2022/050766, Search completed Feb. 28, 2023, Mailed Mar. 9, 2023, 11 pgs.
International Search Report and Written Opinion for International Application No. PCT/NL2023/050362, Search completed Aug. 30, 2023, Mailed Sep. 6, 2023, 7 pgs.
International Search Report and Written Opinion for International Application No. PCT/NL2023/050370, Search completed Sep. 25, 2023, Mailed Oct. 4, 2023, 10 pgs.
Baasner et al., "The Role of Balancing Nanostructured Silicon Anodes and NMC Cathodes in Lithium-Ion Full-Cells with High Volumetric Energy Density", Journal of The Electrochemical Society, vol. 167, No. 2, Article 020516, Jan. 21, 2020, 11 pgs., doi: 10.1149/1945-7111/ab68d7.
Barrett et al., "The Determination of Pore Volume and Area Distributions in Porous Substances. I. Computations from Nitrogen Isotherms", Journal of the American Chemical Society, vol. 73, No. 1, Jan. 1, 1951, pp. 373-380, doi: 10.1021/ja01145a126.
Brunauer et al., "Adsorption of Gases in Multimolecular Layers", Journal of the American Chemical Society, vol. 60, No. 2, Feb. 1938, pp. 309-319, doi: 10.1021/ja01269a023.
Cangaz et al., "Enabling High-Energy Solid-State Batteries with Stable Anode Interphase by the use of Columnar Silicon Anodes", Advanced Energy Materials, vol. 10, No. 34, Sep. 8, 2020, 10 pgs., doi: 10.1002/aenm.202001320.
Lee et al., "Characterization of Joint Quality in Ultrasonic Welding of Battery Tabs", Journal of Manufacturing Science and Engineering, vol. 135, No. 2, Article 021004, Mar. 2013, pp. 021004-1-021004-13, doi: 10.1115/1.4023364.
Petasch et al., "Duo-Plasmaline—a linearly extended homogeneous low pressure plasma source", Surface and Coatings Technology, vol. 93, No. 1, Aug. 1997, pp. 112-118, doi: 10.1016/s0257-8972(97)00015-7.
Piwko et al., "Hierarchical columnar silicon anode structures for high energy density lithium sulfur batteries", Journal of Power Sources, vol. 351, May 31, 2017, pp. 183-191, doi: 10.1016/j.jpowsour.2017.03.080.
Piwko et al., "Enabling Electrolyte Compositions for Columnar Silicon Anodes in High Energy Secondary Batteries", Journal of Power Sources, Jul. 21, 2017, vol. 362, p. 349-357, http://dx.doi.org/10.1016/j.jpowsour.2017.07.046.

* cited by examiner

SILICON COMPOSITION MATERIAL FOR USE AS BATTERY ANODE

CROSS-REFERENCE TO RELATED APPLICATIONS

This application is a 35 U.S.C. § 371 National Phase Entry Application of International Application No. PCT/NL2020/050510 filed Aug. 13, 2020, which claims benefit under 35 U.S.C. § 119(a) of NL Application No. 2023642 filed Aug. 14, 2019, the contents of which are incorporated herein by reference in their entireties.

FIELD OF THE INVENTION

The present invention relates to silicon (Si) composite materials comprising copper (Cu) or titanium (Ti) foils that are useful for anodes in batteries. It furthermore relates to a process of producing silicon composite materials comprising copper or titanium foils. Such anode materials are very useful in batteries as they have a much higher specific capacity than currently used anode materials.

BACKGROUND OF THE INVENTION

Energy storage devices, including batteries and capacitors, are used in various applications. Owing to their relatively high energy densities, relatively high specific energy, light weight, and potential long lifetimes, advanced rechargeable batteries are desirable for a wide range of consumer electronics, electric vehicles, grid storage and other important (future) applications. However, despite the increasing commercial prevalence of lithium (Li)-ion batteries, further development of these batteries is needed, particularly for potential applications in low or zero emission, hybrid-electrical or fully electrical vehicles, drones, consumer electronics, energy efficient cargo ships and locomotives, aerospace applications, and power grids.

Currently, graphite is commonly used commercially as a material for anodes in rechargeable Li-ion batteries because of the reversible intercalation of Li-ions without significant volume (about 10%) and morphology change. The relatively low specific capacity of graphite (370 mA h/g) is its main drawback, which limits the specific capacity of Li-ion batteries. Silicon is seen as a promising replacement for carbon-based anodes for various types of rechargeable batteries, due to silicon's high theoretical specific Li-ion storage capacity of about 3,579 mAh/g compared to other materials. In practice, a lower capacity could be achieved. To date, silicon is being commercialized only as an enhancement additive for carbon-based anodes. One barrier to full implementation of silicon-based electrodes is the fact that Li—Si electrodes experience a high degree of pulverization and exfoliation during lithiation. The disintegration of active silicon material will lead to shorter lifetime of the battery and can potentially generate safety issues due to shorting in the battery.

In WO-A-2015175509, a silicon anode is proposed wherein the silicon is deposited onto a nanowire template, comprising silicon or carbon. A disadvantage of this method is that manufacturing of the silicon anode material is unattractive as various complex manufacturing steps are required, making the manufacturing process rather expensive. Also, the scalability to industrial production levels required for commercialization might be difficult.

In WO-A-2016163878, a silicon anode is proposed comprising a nanostructured thin film layer comprising a plurality of adjacent columns extending in a perpendicular direction from the anode surface, wherein the column comprise silicon with amorphous structures in which nanocrystalline regions exist. A disadvantage of these anodes is that these anodes are vulnerable for detachment of silicon from the anode surface.

Accordingly, there is demand for alternative materials and techniques for the preparation of silicon comprising anodes. There is furthermore a demand for delamination resistant anodes that are suitable for many battery applications. There is furthermore a need to produce these anodes and batteries via an economically attractive process.

SUMMARY OF THE INVENTION

It is an object of the present invention to provide novel silicon comprising anodes. It is another object of the invention to provide silicon anodes that have a higher resistance against delamination and/or pulverization of silicon for various battery applications. It is a further object to use these anodes in rechargeable batteries. It is an even further object of the present invention to provide a process to produce these anodes.

Accordingly, the present invention relates to a silicon composite material for use as a rechargeable battery anode, comprising (i) an electrically conductive substrate comprising a foil of copper or titanium, (ii) an adhesion layer attached to the foil comprising at least one or more metals and/or metal compounds and (iii) an electrode layer comprising silicon attached to the adhesion layer.

The present invention further relates to a rechargeable battery, comprising an electrolyte, a cathode layer, a separator layer and the silicon composite material, the electrolyte layer comprising a lithium salt compound arranged between the cathode layer and the silicon composite material.

The present invention also relates to a process for preparing a silicon composite material for use as a rechargeable battery anode, comprising (i) an electrically conductive substrate comprising a foil of copper or titanium, (ii) an adhesion layer attached to the foil comprising at least one or more metals and/or metal compounds and (iii) an electrode layer comprising silicon attached to the adhesion layer, by low-pressure PECVD.

One of the advantages of the present invention is that the silicon forming process is a self-organizing and spontaneous process for forming on an adhesion layer a continuous amorphous layer nanostructured with a plurality of columns, nanoparticle aggregates, and interfaces there between, yielding a rechargeable battery having an increased storage capacity per unit weight, a reduced capacity fading, and a higher stability in time. The interfaces in the nanostructured amorphous anode layer will locally be perpendicular to the surface of the metal foil that serves as a substrate. The adhesion layer prevents that delamination and/or pulverization of silicon diminishes.

The method of the present invention can be designed as a single step manufacturing process without the need for post-treatment method steps for e.g. the substrate and/or the silicon anode layer, thereby facilitating industrial production levels for commercialization.

DETAILED DESCRIPTION OF THE INVENTION

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

The term "anode" as used herein, refers to a current collector that is coated on one side or on both sides with electrode material.

The term "foil of copper or titanium" as used herein, includes sheet-like materials with a thickness ranging from 5-50 micrometer, produced by either cold rolling or electroplating, and can also comprise alloys of copper or titanium with elements such as magnesium (Mg), zinc (Zn), tin (Sn), phosphor (P) and/or silver (Ag). It can be smooth or textured, with a tensile strength preferably ranging from 150 to 600 MPa, and might comprise a passivation layer deposited on the copper foil to protect the copper foil from oxidation in air.

The term "CVD" as used herein includes all processes in which a thin coating of a solid material is formed from by a chemical reaction between vapors or gases on a solid substrate at elevated temperatures.

The term "PECVD process" as used herein, includes all processes of plasma-enhanced chemical vapor deposition (PECVD) that use a plasma generated with the aid of electromagnetic waves in the frequency range of microwaves (MW), very-high-frequency (VHF), radiofrequency (RF), or with a DC electric field, or with expanding thermal plasma (ETP) to promote a chemical reaction from which silicon is formed.

The term "low-pressure PECVD" herein refers to PECVD processes in which the operating pressure is in the range of 0.01-10 mbar The term MW-PECVD herein refers to a PECVD process where microwaves are used to create a plasma.

The term "silicon layer" herein refers to a layer with a thickness of 5-50 micrometer that consists of silicon, hydrogenated silicon or doped silicon that is either amorphous, or crystalline, or a mixture of amorphous and crystalline.

The term "hydrogenated silicon", or "a:Si—H" refers to amorphous silicon with a hydrogen concentration up to 20%.

The term "amorphous silicon" should be construed as comprising protocrystalline silicon, which is a definition for amorphous silicon comprising a fraction of nano-crystalline silicon. This fraction may be up to about 30% of the nanostructured silicon thin film layer. For ease of reference the term amorphous silicon will be used hereinafter to indicate that the nanostructured silicon thin film layer comprises amorphous silicon, in which nano-crystalline regions of the nanostructured silicon thin film layer may be present with a fraction of nanocrystalline silicon up to about 30%.

Furthermore, it is noted that additionally or alternatively to "silicon", the columns may comprise a silicon-based material, i.e., a silicon-based alloy or silicon-based mixture. Thus, the term "silicon" should also be construed as comprising silicon-based materials, i.e., silicon-based alloys or silicon-based mixtures. The columns may comprise either amorphous silicon or amorphous silicon alloy or a combination of amorphous silicon and amorphous silicon alloy.

The term "doping of silicon" refers to silicon with traces of one of the elements N, P, B, Al, C, in which the trace elements increase the conductivity or improve the crystal structure of the silicon.

The silicon composite material device according to the invention is designed to be used in a rechargeable battery, as anode. It comprises (i) an electrically conductive substrate comprising a foil of copper or titanium, (ii) an adhesion layer attached to the foil comprising at least one or more metals and/or metal compounds, and (iii) an electrode layer comprising silicon attached to the adhesion layer.

The prior art anodes with silicon were tested and showed problems with pulverization or detachment of silicon and loosing capacity when charging multiple times.

Applicant now surprisingly found that when silicon is deposited on a copper foil or a titanium foil, that the adherence of silicon to the foil is increased when the foil has been coated with metals or with metal compounds forming an adhesion layer. In this way higher resistance against delamination and/or pulverization of silicon for various battery applications was surprisingly achieved.

The adhesion layer comprises at least one or more metals and/or metal compounds that differ from the metal of the foil itself. Thus, the copper foil comprises at least one or more metals and/or metal compounds not being copper and/or copper compounds and the titanium foil comprises at least one or more metals and/or metal compounds not being titanium and/or titanium compounds itself.

Advantageously, the adhesion layer attached to the copper foil or titanium foil comprises zinc or tin, or a compound thereof. More advantageously, the adhesion layer attached to the foil comprises oxides of zinc and/or tin. This layer of zinc or tin or their oxides increases the adhesion between silicon and the copper- or titanium-foil as different complexes of silicon are being formed on the interface between the foil and the silicon. Even more advantageously, the oxides of zinc are doped with aluminum (Al), and the oxides of tin are doped with fluor (F) or indium (In) to further increase the electrical conductivity of the layer.

It is most preferred to use a foil of copper, that has been coated with a zinc oxide, ZnO. Application of ZnO or $SnO_2$ will increase the adhesive force between the silicon layer and the metal foil.

To prepare such an adhesion layer attached to the foil, use is preferably being made of Physical Vapor Deposition (PVD), Chemical Vapor Deposition (CVD) or Electrodeposition. The layer is preferably less than 50 nm thick.

The silicon layer is advantageously present at both sides of the copper or titanium foil, and the adhesion layer comprising of one or more metals and/or metal compounds is advantageously also present at both sides of the copper foil. This increases the anode capacity when in use per unit of volume.

The adhesion layer of one or more metals and/or metal compounds onto the copper or titanium foil is preferably up to 5 nm thick, more preferably in the range of from 1 up to 2 nm thick.

Advantageously, the adhesion layer covers at least 50% of the surface of the copper or titanium foil, more preferably at least 80% of the surface, even more preferably at least 90% of the surface, most preferably at least 95% of the surface. Preferably, the layer is a smooth layer, with equal thickness.

Advantageously, the adhesion layer might be produced by electrochemical coating of copper foil with one or more metals and/or metal compounds and letting the one or more metals and/or metal compounds oxidize to their oxides. Alternatively the metals and/or metal compounds can be deposited with physical vapor deposition techniques such as sputtering of a metals and/or metal compounds target or electron-beam or laser ablation of such a target, or it can be deposited with CVD, PECVD, or atomic layer deposition, or plasma-enhanced atomic layer deposition techniques using a metal-organic metal precursor and an oxidizer such as water or oxygen, or a plasma of water or oxygen. These depositions might be performed in a separate deposition process or might be integrated into the silicon deposition process used to produce the anodes. Preferably, the adhesion layer is deposited with electrodeposition, physical vapor deposition, plasma enhanced chemical vapor deposition or atomic layer deposition.

The silicon layer is preferably attached to the adhesion layer as a thin film layer comprising a plurality of adjacent columns and aggregated particles with a diameter of at least 5 nm, up to 50 nm, more preferably in the range of from 10 up to 20 nm, the columns extending in a perpendicular direction from the copper foil surface, wherein the adjacent columns are separated by column boundaries extending in the perpendicular direction.

The silicon layer has preferably an amorphous structure in which nano-crystalline regions exist. More preferably, the columns comprise up to 30% of nano-crystalline silicon.

According to an embodiment, the nanostructured silicon thin film layer advantageously comprises n-type or p-type dopants to obtain a nanostructured silicon thin film layer of respectively n-type conductivity or p-type conductivity.

Advantageously, the silicon columns further comprise a silicon alloy or composite, wherein the silicon alloy is preferably selected from the group comprising Si—C and/or Si—N.

The silicon alloy may be either an addition or an alternative to the amorphous silicon. Thus, according to an aspect of the invention, the material of the columns comprises at least one material selected from amorphous silicon and amorphous silicon alloy. According to a further aspect, the material of the columns comprises amorphous silicon and nano-crystalline silicon alloy. In some embodiments, the silicon alloy may be present in the electrode layer as a nano-crystalline phase.

Also, the anode layer may comprise a mixture of an amorphous material and nano-crystalline phase. For example, a mixture of amorphous silicon and nanocrystalline silicon, or a mixture of amorphous silicon with nanocrystalline silicon alloy, or a mixture of silicon and silicon-based alloy predominantly in an amorphous state comprising a fraction (up to about 30%) of the mixture in a nano-crystalline state.

According to the present invention, the amorphous silicon columns are preferably extending in a perpendicular direction from the anode surface, i.e. the interface between the anode layer and the electrolyte layer, in which the plurality of silicon columns are arranged adjacent to each other while separated by interfaces extending perpendicularly to the anode surface.

Advantageously, the electrode layer comprising silicon has a porosity of 10% up to 50% with a pore size in the range of 10-40 nm. This is preferably measured with Barrett-Joyner-Halena method.

The silicon composite material for use as a rechargeable battery anode comprises an electrode layer having a thickness preferably of 1 μm up to 30 μm, preferably of about 10 μm up to 20 μm or a mass loading of 2.5 up to 4.0 mg/cm$^2$.

The present invention is furthermore directed to a rechargeable battery, comprising an electrolyte, a cathode layer, a separator layer and the silicon composite material as described above, the electrolyte layer comprising a lithium salt compound arranged between the cathode layer and the silicon composite material. The cathode of the rechargeable battery is preferably a nickel manganese cobalt oxide, a lithium cobalt oxide, a lithium cobalt aluminum oxide, a lithium manganese oxide, or a lithium iron phosphate. Nickel manganese cobalt oxide is most preferred because it will give the highest specific capacity, but other suitable materials might be used as well.

The rechargeable battery of the present invention exhibits a higher storage capacity per unit weight and volume than prior art lithium ion batteries, as the use of silicon allows for storage of larger amounts of lithium per unit volume and weight. As a result, the specific capacity of an anode-separator-cathode stack filled with electrolyte can reach up to 480 Wh/kg (140 Ah/kg at a voltage of 3.5 V). Furthermore, the open nanostructure of the electrode layer improves the accessibility and diffusion of lithium ions in and out of the nanostructured silicon thin film layer during a charging cycle, i.e. during lithiation and de-lithiation.

The present invention is furthermore directed to the process for preparing a silicon composite material for use as a rechargeable battery anode, comprising providing (i) an electrically conductive substrate comprising a foil of copper or titanium, providing (ii) an adhesion layer attached to the foil comprising at least one or more metals and/or metal compounds, and forming (iii) an electrode layer comprising silicon attached to the adhesion layer by low pressure Plasma-Enhanced Chemical Vapour Deposition (PECVD). The process comprises the steps of forming on a foil of copper or titanium which comprises an adhesion layer with one or more metals and/or metal compounds a nanostructured silicon thin film layer as an anode layer, wherein the forming process is configured to create the nanostructured silicon thin film layer comprising a plurality of adjacent silicon columns and nanoparticle aggregates. As explained above, a nanostructured silicon thin film layer is capable of providing a significantly higher, e.g. 10-fold, energy storage capacity than prior art graphite anodes.

During the formation process, the silicon-based columns are extending perpendicularly to a surface of the foil with adhesion layer. The plurality of silicon columns is arranged adjacent to each other while separated by interfaces extending in the perpendicular direction, with the separation distance of the interfaces being substantially parallel to the surface of the nanostructured thin film layer. Once formed, the plurality of silicon columns comprises amorphous silicon (am-Si), as verified by structural analysis of the thin film material.

As mentioned before, the term amorphous silicon should be construed as comprising proto-crystalline silicon, thus wherein amorphous silicon comprises regions of nano-crystalline silicon in a fraction up to about 30% of the nanostructured silicon thin film layer. Further, the term "silicon" should also be construed as comprising silicon-based materials, i.e., silicon alloys and doped silicon.

An advantage of the method is that the plurality of silicon columns is formed in a self-organizing fashion and randomly distributed across the foil, so it is not necessary to actively steer or control the column formation. The method of the present invention is therefore a self-organizing, spontaneous process for forming a nanostructured silicon thin film layer without post-processing steps. As a result, the method is readily adapted to produce silicon-based anodes at industrial levels for commercialization.

In an embodiment, the forming process comprises deposition of the anode layer by PPECVD, thereby allowing for deposition of a nanostructured thin film anode layer having a thickness of from 1 μm to 30 μm.

Thus, the present invention is directed to the process for preparing an anode device comprising a foil of copper or titanium covered with a layer of silicon, by depositing silicon on the foil which foil has been coated with one or more metals and/or metal compounds, by low-pressure PECVD. The PECVD process preferably comprises the use of a microwave plasma or a mixture comprising a silicon-containing gas and hydrogen, in which the forming process is configured to create a nanostructured thin film layer.

In a further embodiment the microwave plasma is created by an elongated antenna wire, of which each end of the wire is coupled to a microwave generator. More preferably, the mixture of a silicon-containing gas and hydrogen further comprises an alloying compound, for forming the silicon alloy.

In a further embodiment, the PECVD process comprises the use of a microwave plasma of a mixture of a silicon compound gas and hydrogen, $H_2$. The silicon compound may be for example silane $SiH_4$ or a chloro-silane e.g. $SiCl_4$. Preferably, the silicon-containing gas is selected from a group comprising monosilane, disilane, trisilane, and chlorosilanes.

The use of microwave frequencies reduces ion bombardment of anode growth zones on the substrate during the forming process, so that growth rates of the anode layer are increased.

In an even further embodiment, the mixture of silicon compound gas and $H_2$ further comprises argon (Ar). Using such a mixture allows for a sustained plasma at lower pressures and to promote self-organized growth of the nanostructured silicon thin film layer, i.e., the plurality of silicon columns and column boundaries, i.e., interfaces there between. Here, self-organized growth means that the formation of the plurality of silicon columns and nanoparticle aggregates and the interfaces between them occurs spontaneously. The plurality of silicon columns is deposited in a substantially random fashion across and along the foil, thus forming a substantially random arrangement. The self-organized formation of the plurality of silicon columns can be viewed as a one-step manufacturing process, circumventing post-treatment of the foil or deposited silicon anode layer.

Additionally, the formation of the nanostructured thin film layer might comprise addition of a doping precursor to obtain a doped nanostructured silicon thin film layer of either n-type or p-type in dependence of the precursor type. In an embodiment, the precursor is a gaseous species added to the mixture of silane and hydrogen.

The PECVD process used is advantageously a low-pressure PECVD process. For example, in an embodiment the low-pressure PECVD process comprises pressures above 0.15 mbar, so that a sustainable plasma can be maintained when a mixture of the silicon compound gas e.g. silane and hydrogen is used. In another embodiment the low-pressure PECVD process comprises pressures below 0.15 mbar when the mixture of e.g., silane and hydrogen further comprises argon.

In a further embodiment, the PECVD process is a microwave PECVD process. To allow for large area production of silicon anode layers, in an advantageous embodiment the microwave plasma is created by an elongated antenna wire, of which each end of the wire is coupled to a microwave generator. The elongated antenna wire provides a substantially linear and uniform field of microwave radiation in the plasma reactor during the formation process, so that a more uniform deposition of the plurality of silicon columns is achieved over a large area. In an embodiment the length of the antenna wire is at least 50 cm, more preferably at least 100 cm, e.g. 120 cm, preferably up to 200 cm, more preferably up to 150 cm. The length of the antenna wire directly influences the surface area produced of the nanostructure silicon thin film layer per unit time. Increasing the length of the antenna wire typically increases the achievable surface area of the nanostructured silicon thin film layer that can be manufactured per unit time.

Without any limitation of the inventive concept and without being bound to any theory on the deposition mechanism, it is considered that according to an embodiment the method for formation of the nanostructured silicon thin film, is configured to provide growth conditions of the silicon thin film where the deposited silicon atoms experience a relatively low surface mobility resulting in the typical nanostructure of the silicon thin film.

The following, non-limiting embodiments of the invention are further described hereinafter with reference to the accompanying figures, wherein like letters and numerals refer to like parts, wherein the figures are approximately to scale, and wherein:

FIG. 3 illustrates an example of A. double-sided and B. single-sided anode structure.

FIG. 7 illustrates the stability of the silicon electrode of A. an electrode produced on copper foil with a ZnO coating, and B. of and electrode produced on copper foil with a chromate coating.

Figure 1:
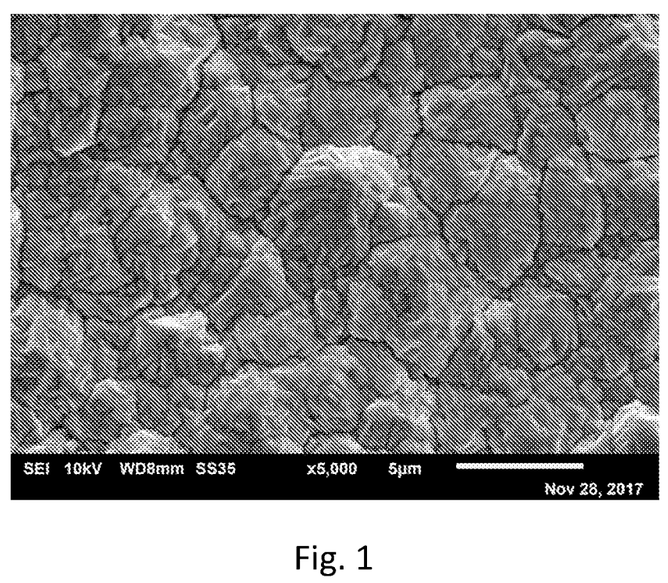
FIG. 1 illustrates an example of the surface of rough copper foil (SEM).
Figure 2:
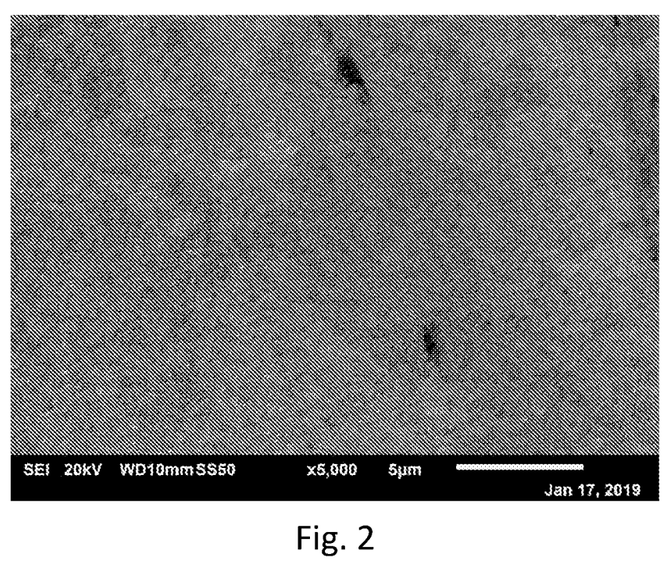
FIG. 2 illustrates an example of the surface of a smooth copper foil (SEM).

FIGS. 1 and 2 show the same copper foil, on the different sides of the foil. FIG. 1 shows a Scanning Electron Microscope (SEM) image of the surface of a textured side of the copper foil that can serve as a substrate for the silicon anode. The surface can have features with dimensions up to several micrometres. The textured copper foil has a roughness of approximately 1 micrometer. The deposited silicon layer follows the surface roughness.

In FIG. 2 a SEM image of the other side of the copper foil is shown, that can also serve as a substrate for the silicon anode. Here the surface is smoother as compared to the foil shown in FIG. 1.

Figure 3:
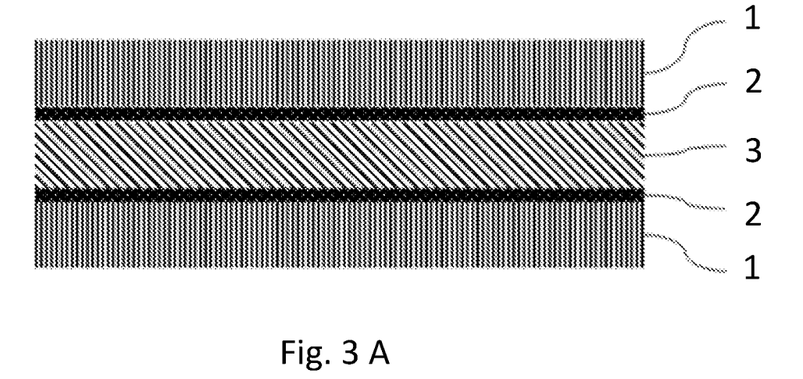

In FIG. 3 two schematic configurations are shown of the anode material. In FIG. 3A a double-sided anode is shown, wherein the top layer is the electrode layer (1) made of silicon, the layer in between is the adhesion (2) made for example of ZnO and the layer in between is the current collector (3) made of copper or titanium according to an embodiment of the invention. The current collector (3) is on the opposite side also covered by an adhesion layer (2) and an electrode layer (1). In FIG. 3B the single-sided anode structure is shown with an electrode layer (1) made of silicon, the layer in between is the adhesion layer (2) made for example of ZnO and the layer in between is the current collector (3).

Figure 4:
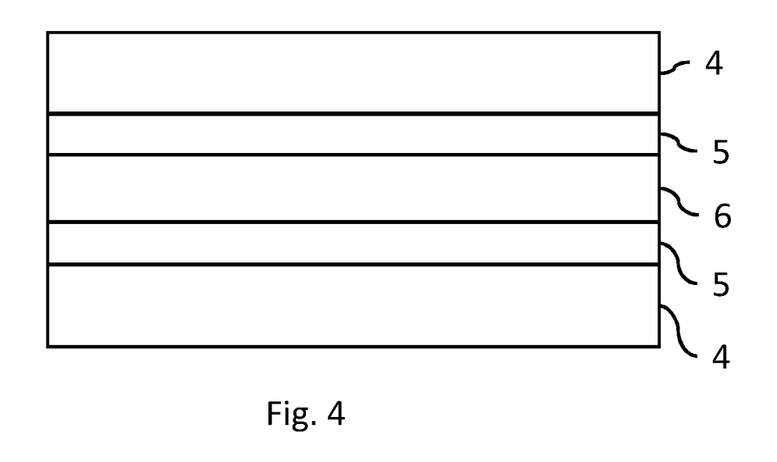
FIG. 4 illustrates the structure of a battery cell with a double-sided silicon anode, two single-sided cathodes, and two separators.

In FIG. 4 the structure of a battery cell with a double-sided silicon anode (6), two single-sided cathodes (4), and two separators (5) is schematically depicted. This represents a typical layout for an electrode stack inside a lithium-ion battery cell.

Figure 5:
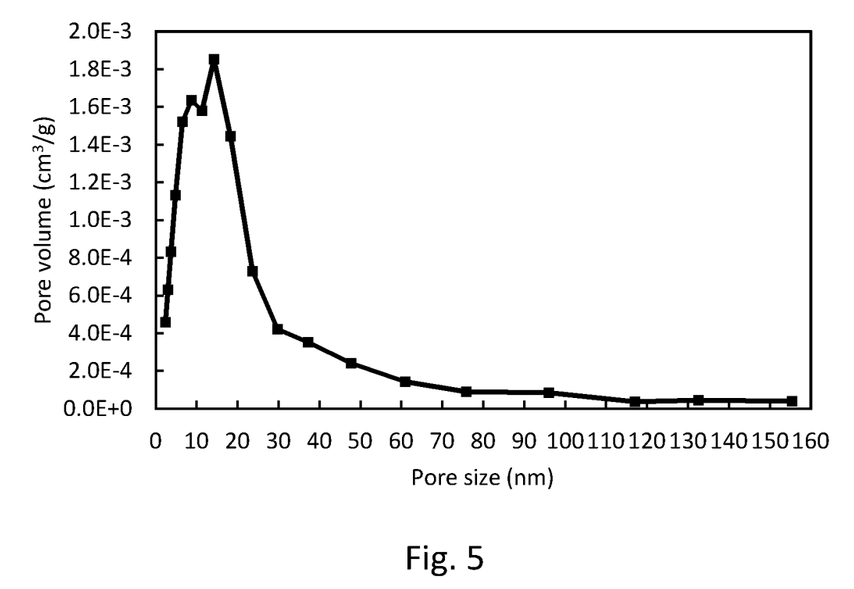
FIG. 5 illustrates the size distribution of micropores in the silicon.

FIG. 5 shows a typical pore size distribution of the porous silicon deposited with the PECVD process measured with Barrett-Joyner-Halena method. It shows that the average pore size is smaller than 100 nm and that most of the pore volume is made of pores with a size between 10 and 30 nm. Integration of the pore size shows that the porosity of the material is about 20%.

Figure 6:
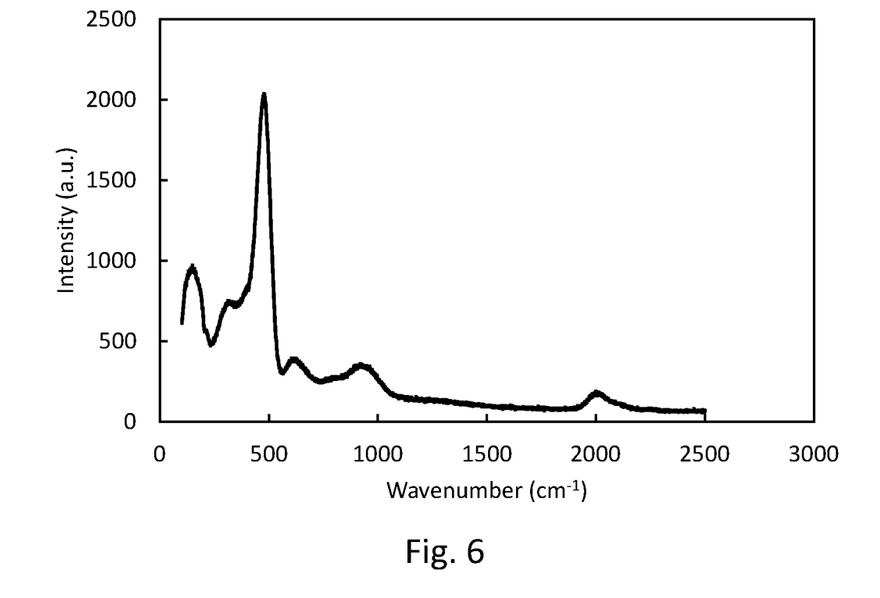
FIG. 6 illustrates a Raman spectroscopy measurement of the silicon.

In FIG. 6 a Raman spectroscopy measurement of the silicon is shown. The broad peak at 477 cm$^{-1}$ indicates the presence of amorphous silicon. The absence of a sharp peak at 520 cm$^{-1}$, normally attributed to crystalline silicon, indicates that the silicon is mainly amorphous.

Figure 8:
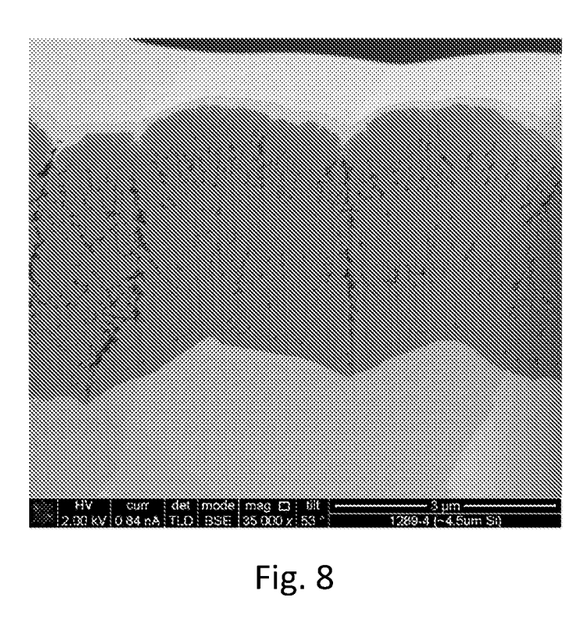
FIG. 8 illustrates a cross-sectional SEM image of the silicon electrode

FIG. 8 is a cross-sectional SEM image that illustrates the typical material structure, depicting the combination of column-like structures and particle aggregates. Also, it clearly depicts shows that the layer of silicon follows the structure of the substrate, which means that the silicon loading is homogeneously distributed.

Figure 9:
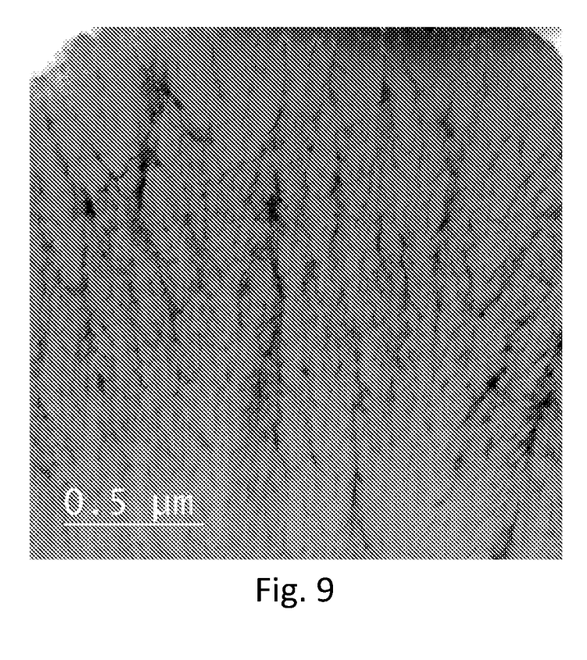
FIG. 9 illustrates a TEM image of the silicon electrode showing the particle structure.

FIG. 9 shows a TEM image of the particle-aggregate structure that makes up the silicon anode layer. It shows that the primary silicon particles that make up the anode layer are in the size range of 10-20 nm. It also shows that there is ample space between the particles that enables both expansion of the silicon during lithiation and the transport of electrolyte through the layer.

Figure 10:
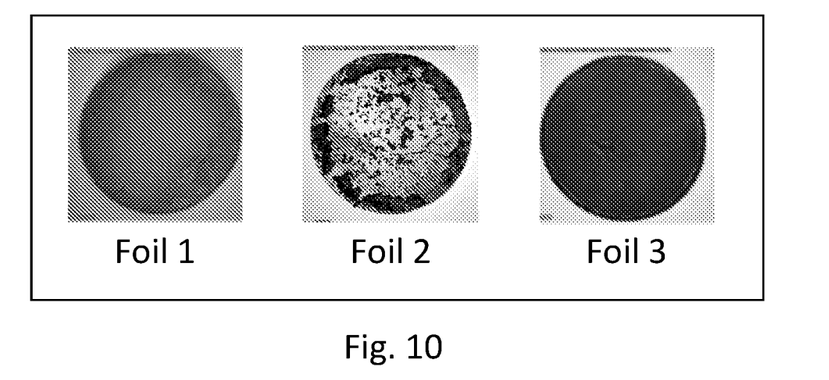
FIG. 10 illustrates copper foil with Si after undergoing several charge/discharge cycles in coin cells.

FIG. 10 shows a comparison between three anodes that were cycled in a coin cell. Foil 1 is a copper foil with a thin layer of ZnO and a coating of amorphous Si. Foil 2 is a copper foil with a thin layer of $Cr_2O_3$ and a coating of amorphous Si. Foil 3 is a copper foil with a thin layer of $Cr_2O_3$ on top of which a thin layer of ZnO is deposited, and a coating of amorphous Si.

The following, non-limiting examples are provided to illustrate the invention.

EXAMPLE 1

The copper foil that gave good adhesion was prepared with an electrodeposition process that also includes electrochemical deposition of a thin ZnO layer (foil 1 in FIG. 10). Next to that a copper foil with a deposited $Cr_2O_3$ coating also prepared with electrodeposition (foil 2 in FIG. 10) and a copper foil with a Al-doped ZnO coating deposited by sputtering on top of a thin $Cr_2O_3$ layer deposited with electrodeposition (foil 3 in FIG. 10) was prepared. The elemental compositions of the copper foil surfaces was measured using X-ray photoelectron spectroscopy. The results of the measurements given in table 1 show that the surface of the copper foil is covered with a layer of metal oxide, being ZnO, $Cr_2O_3$ or Al-doped ZnO.

TABLE 1

Elemental composition of the surface of the prepared anode, measured with X-ray photoelectron spectroscopy.

| Element | Cu | Al | Zn | Cr | C | O | P | S | Cl | N |
|---|---|---|---|---|---|---|---|---|---|---|
| Peak | 2 p | 2 s | 2 p | 2 p | 1 s | 1 s | 2 s | 2 p | 2 p | 1 s |
| Foil 1 | 2.6 | 0 | 17.4 | 0 | 20.0 | 56.8 | 2.2 | 0.9 | 0.3 | 0.1 |
| Foil 2 | 14.4 | 0 | 0 | 10.2 | 19.0 | 55.5 | 0 | 0 | 0.6 | 0.3 |
| Foil 3 | 0.7 | 1.1 | 10.8 | 2.8 | 53.0 | 31.5 | 0 | 0 | 0 | 0 |

In foil 1, a small fraction of Cu is measured, besides a larger fraction of Zn, from which can be concluded that the layer of ZnO has a thickness of less than 5 nm or that the surface is not fully covered with ZnO, but around 90%. The presence of O indicates that the Zn is oxidized to ZnO. In foil 2, the Cu is coated with a $Cr_2O_3$ coating that also has a thickness of less than 5 nm, based on the ratio Cr/Cu or a partial coverage of the surface of the Cu foil. Foil 3 has a dense coating of Al-doped ZnO of 5 nm based on the average sputter deposition rate of the sputtering tool. The layer of Al-doped ZnO is most likely very dense as the signals for Cu and Cr are quite low compared to that of Zn. The concentration Al doping is approximately 10%. In all samples, the presence of carbon is most likely caused by sample pollution by exposure to air, whereas the presence of P, Cl and S is most likely the result of remainings of the foil production.

To test the adhesion strength of silicon to the copper foil coin cells were built in which the electrode comprising of Cu foil, adhesion layer, and Si and a Li counter electrode was tested over several cycles. Post-mortem images after several cycles, are shown in FIG. 10. The foils that have a ZnO layer between Cu and Si have the Si still attached to the Cu foil, whereas the Si has almost completely detached from the $Cr_2O_3$-coated foil.

EXAMPLE 2

The cycling stability of electrodes produced with copper foil comprising a zinc oxide adhesion layer are compared to copper foils comprising a coating made of chromate, and a foil that had no adhesion layer. All foils are 8-10 micron thick. Lithium metal was used as counter electrode, which in this example made the silicon-containing copper foils act as the cathode rather than as anode. As these experiments were used for comparison and stability tests, the results can be extrapolated to an electrode layer comprising silicon as anode.

The electrode that was produced without any adhesion layer was not mechanically stable and could not be used to make a coin cell. Therefore, there are no electrochemical measurements available.

The electrodes made with copper foils that had chromate and zinc oxides coatings were placed in a coin cell. The electrolyte used comprised LiPF6, with a concentration of 1 M, in a 1:1 by volume mixture of ethylene carbonate and di-ethyl carbonate. To this electrolyte 2 weight % vynilene carbonate and 25 weight % fluorethylene carbonate was added.

Figure 7:
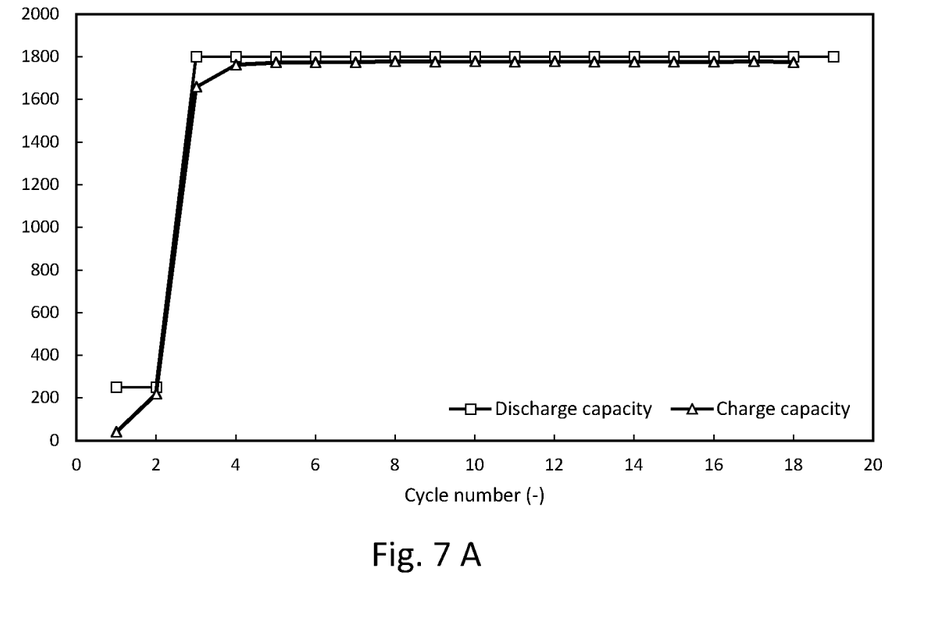

The cells were cycled at a constant capacity of 1800 mAh per gram of silicon. The cycle results are given in FIG. 7. The results show that the stability of the electrode is greatly improved by using the ZnO-coated copper foil compared to the foil with a chromate coating.

The invention claimed is:

1. A silicon composite material for use as a rechargeable battery anode, comprising:
   (i) an electrically conductive substrate comprising a foil of copper or titanium,
   (ii) an adhesion layer attached to the foil, where the adhesion layer comprises at least one material selected from the group consisting of:
      a metal selected from the group consisting of zinc and tin; and a metal compound selected from the group consisting of an oxide of zinc and an oxide of tin, and (iii) an electrode layer comprising silicon, wherein the electrode layer is attached to the adhesion layer, and wherein the adhesion layer has a thickness in a range from 0.1 nm up to and including 5 nm.

2. The silicon composite material of claim 1, wherein the foil comprises a metal compound that is selected from the group consisting of:

an oxide of zinc doped with aluminum; and an oxide of tin doped with at least one of fluorine or indium.

3. The silicon composite material of claim 1, wherein the foil comprises a metal compound and the metal compound is ZnO.

4. The silicon composite material of claim 1, wherein the silicon electrode layer comprising silicon and the adhesion layer are present at both sides of the foil.

5. The silicon composite material of claim 1, wherein the adhesion layer has a thickness in the range of from 1 nm up to 2 nm.

6. The silicon composite material of claim 1, wherein the adhesion layer is characterized by having been deposited by electrodeposition, physical vapor deposition, plasma enhanced chemical vapor deposition, or atomic layer deposition.

7. The silicon composite material of claim 1, wherein the silicon of the electrode layer comprises a plurality of adjacent columns and nanoparticle aggregates, the columns extending in a perpendicular direction from the foil surface, wherein the adjacent columns are separated by column boundaries extending in the perpendicular direction.

8. The silicon composite material according to claim 7, wherein the silicon has an amorphous structure comprising nano-crystalline regions.

9. The silicon composite material according to claim 7, wherein the columns comprise up to 30% of nano-crystalline silicon.

10. The silicon composite material of claim 7, wherein the electrode layer further comprises a silicon alloy, wherein the silicon alloy is selected from the group consisting of Si—C and Si—N.

11. The silicon composite material of claim 1, wherein the electrode layer comprising silicon has a porosity in the range of 10% to 50%.

12. The silicon composite material of claim 1, wherein the electrode layer has a thickness in the range of 1 μm to 30 μm.

13. A rechargeable battery, comprising an electrolyte, a cathode layer, a separator layer and the silicon composite material of claim 1, the electrolyte arranged between the cathode layer and the silicon composite material, and further comprising a lithium salt compound.

14. The rechargeable battery according to claim 13, wherein the cathode layer comprises nickel manganese cobalt oxide, lithium cobalt oxide, lithium cobalt aluminum oxide, lithium manganese oxide, or lithium iron phosphate.

* * * * *